(12) United States Patent
Pickard et al.

(10) Patent No.: US 7,966,198 B2
(45) Date of Patent: Jun. 21, 2011

(54) METHOD AND SYSTEM FOR PRICING AND MARKETING FINANCIAL PRODUCTS

(75) Inventors: James Pickard, Broomall, PA (US); Edward Johnston, Malvern, PA (US); Richard Dutton, Bala Cynwyd, PA (US); Ronald Lafkoski, Quakertown, PA (US)

(73) Assignee: Mass Marketing Insurance Group, Wayne, PA (US)

( * ) Notice: Subject to any disclaimer, the term of this patent is extended or adjusted under 35 U.S.C. 154(b) by 1525 days.

(21) Appl. No.: 11/320,284

(22) Filed: Dec. 28, 2005

(65) Prior Publication Data
US 2007/0150318 A1    Jun. 28, 2007

(51) Int. Cl.
*G06Q 40/00* (2006.01)
(52) U.S. Cl. .............................................. 705/4; 705/35
(58) Field of Classification Search ........................ 705/4
See application file for complete search history.

(56) References Cited

U.S. PATENT DOCUMENTS

2003/0120521 A1\* 6/2003 Sherman ........................... 705/4
2006/0155621 A1\* 7/2006 Bell ................................. 705/35

\* cited by examiner

*Primary Examiner* — Jagdish N Patel
*Assistant Examiner* — Kevin Poe
(74) *Attorney, Agent, or Firm* — Michael B. Fein; Cozen O'Connor

(57) ABSTRACT

A method and system for pricing, designing, and marketing, insurance policy contracts is disclosed. The policy contracts comprise a first period of coverage for a first benefit amount for which a premium is paid to an insurer on behalf of an insured person by a sponsoring organization and a second period of coverage for a second benefit amount for which a premium is paid to the insurer by the insured person, wherein prior to the first period of coverage, the insurer obtains authorization from the insured to have premiums for the second period paid automatically from an account, comprising the steps of charging the sponsoring organization a premium for the first period of coverage upon entering into a policy contract between the insurer and the insured, and automatically charging one or more premiums to the account of the insured at the end of the first period and during the second period of coverage.

17 Claims, 1 Drawing Sheet

METHOD AND SYSTEM FOR PRICING AND MARKETING FINANCIAL PRODUCTS

FIELD OF THE INVENTION

This invention relates generally to automated systems for pricing and marketing financial service products, and particularly to the pricing and marketing of insurance policies.

BACKGROUND OF THE INVENTION

Many methods have been utilized to market insurance and related financial products by various insurance companies, brokers, agents, advertising companies, and intermediaries of various sorts. Design and implementation of marketing programs is an art unto itself. Many programs are improved over time by trial and error and are often based on intuition and guesswork on the part of the insurance companies, brokers, agents, and the like.

Among the wide variety of insurance products which have been developed over time, one class of product has been relatively successful for many companies, such product being one where a relatively small amount of complimentary insurance coverage is offered to individuals by sponsoring organizations and a relatively larger amount of voluntary insurance coverage is also offered to the individual, wherein the voluntary coverage is paid for by the individual rather than the sponsoring organization. This class of products is known as "complimentary insurance."

Many different permutations and combinations of complimentary and voluntary coverage have been tested. Such permutations and combinations have varying pricing to the sponsoring organization, lengths and amounts of coverage, timing to offer the voluntary coverage feature, and the like.

SUMMARY OF THE INVENTION

It is an object of the present invention to provide an improved method and system for designing, marketing, and pricing complimentary insurance packages.

This object, and others which will become apparent from the following disclosure, are achieved by the present invention which comprises in one aspect a method for pricing and marketing insurance policy contracts, the policy contracts comprising a first period of coverage for a first benefit amount for which a premium is paid to an insurer on behalf of an insured person by a sponsoring organization and a second period of coverage for a second benefit amount for which a premium is paid to the insurer by the insured person, wherein prior to the first period of coverage, the insurer obtains authorization from the insured to have premiums for the second period paid automatically from an account, comprising the steps of charging the sponsoring organization a premium for the first period of coverage upon entering into a policy contract between the insurer and the insured, and automatically charging one or more premiums to the account of the insured at the end of the first period and during the second period of coverage.

This automatic upgrade of complimentary insurance method converts complimentary insurance coverage into an increased amount of coverage paid for by the individual at the end of a predetermined period of time, referred to herein as the initial coverage period. This automatic upgrade is accomplished by programming the policy administration computer systems to increase benefit levels and generate premium billing on a predetermined date. Prior to marketing, application codes are defined for automatic upgrading, each application code corresponding to an initial benefit amount, an initial coverage period, an increased benefit amount, and a premium amount. The application code is input into the administration system along with the applicant's personal information and the computer system reads the application code and generates the policy documents. The computer system also establishes a benefit increase date, premium amount, and billing date, all based on effective date of the automatic upgrade.

In some embodiments, the second benefit amount is at least three times the first benefit amount, and can be any multiple of the first benefit amount, but is preferably at least ten times the first benefit amount.

The first benefit amount is preferably determined by a formula, First benefit amount=P4/(CR/CC4), wherein P4=the annual premium for 1st period coverage; CR=the claims incidence rate; and CC4=the anticipated claims cost percentage for 1st period coverage.

Additional marketable sponsor leads are preferably determined according to a formula as follows: Additional marketable sponsor leads=(L×R2×P2×(1−CC2)×PR2×AF2)/M1, wherein L=sponsor leads eligible for marketing; R2=percent of L enrolling for first period coverage; P2=annual premium for second period coverage; CC2=the anticipated claims cost percentage for second period coverage (P2); PR2=Percent of policies issued for first period coverage for which the first modal premium is paid for second period coverage; AF2=present value of future P2 at a selected discount rate, D, divided P2; P2=annual premium for second period coverage; and M1=marketing cost of initial solicitation.

Profit per policy to the insurer is maximized according to the invention. Such profit per policy is preferably determined according to the following formula:

$$\text{Profit per policy} = (((L \times R1 \times P1 \times PR1 \times AF1) + (L \times R2 \times P2 \times PR2 \times AF2) + (L \times R2 \times R3 \times P3 \times PR3 \times AF3)) - (CC1 \times (L \times R1 \times P1 \times PR1 \times AF1)) - (CC2 \times (L \times R2 \times P2 \times PR2 \times AF2)) - (CC3 \times (L \times R2 \times R3 \times P3 \times PR3 \times AF3)) - (CC4 \times (L \times R2 \times P4)) - (C \times ((L \times R1 \times P1 \times PR1 \times AF1) + (L \times R2 \times P2 \times PR2 \times AF2) + (L \times R2 \times R3 \times P3 \times PR3 \times AF3))) - (L \times M1) - (L \times R2 \times M2) - (L \times R1 \times A1) - (L \times R2 \times A2) - (L \times R2 \times R3 \times A3))/(L \times R2),$$

wherein

L=sponsor leads eligible for marketing

R1=percent of L enrolling for coverage in addition to first period coverage

P1=annual premium for coverage in addition to first period coverage

PR1=percent of policies issued for coverage in addition to first period coverage for which the first modal premium is paid AF1=present value of future P1 at a specific discount rate divided P1

R2=percent of L enrolling for first period coverage

P2=annual premium for second period coverage

PR2=Percent of policies issued for first period coverage for which the first modal premium is paid for second period coverage AF2=present value of future P2 at a specific discount rate divided P2

R3=percent of first period policies issued that at the end of the first period coverage enroll in additional coverage P3=annual premium for additional coverage offered at the end of the first coverage period PR3=Percent of policies issued for additional coverage at the end of the first period for which the first modal premium is paid AF3=present value of future P3 at a specific discount rate divided P3

CC1=the anticipated claims cost percentage for additional coverage (P1)
CC2=the anticipated claims cost percentage for second period coverage (P2)
CC3=the anticipated claims cost percentage for additional coverage issued at the end of the first period coverage
CC4=the anticipated claims cost percentage for $1^{st}$ period coverage
P4=the annual premium for $1^{st}$ period coverage
C=commission percentage of collected premiums paid to sponsor
CR=claims incidence rate
M1=marketing cost of initial solicitation
M2=marketing cost of solicitation at the end of the first coverage period
A1=administration cost for coverage in addition to first period coverage
A2=administration cost for second period coverage
A3=administration cost for coverage offered at the end of the first coverage period.

The type of policy can be varied according to this invention, and thus the benefit amounts can be payable upon accidental death, accidental disability, disability, dismemberment, paralysis, hospitalization, diagnosis of a critical illness, unemployment, a family leave event, or loss of life.

The account from which the premium can be automatically drawn can also vary, for example the account can be a checking account, credit card account, credit union account or mortgage account between the insured and the sponsoring organization, or an organization other than the sponsoring organization.

The computer system can be programmed so that the insured person receives one or more premium invoices from the insurer for premiums due after the first period and during the second period of increased coverage.

The method and system can give the insured an option prior to or during the first period to increase the second period coverage amount or to enroll in another insurance coverage, for example.

In most embodiments, the insurance contract pays a benefit amount to a beneficiary upon the filing of a valid claim by the insured or on behalf of the insured as a result of a covered event.

In some embodiments, an insurer pays a commission to the sponsoring organization during the second period of coverage upon collecting a premium from the insured, charging the sponsoring organization a premium for the first period of coverage upon entering into a policy contract between the insurer and the insured.

In certain embodiments the insurer pays a list marketing fee to the sponsoring organization comprising the means for charging the sponsoring organization a premium for the first period of coverage upon entering into a policy contract between the insurer and the insured.

The method for assembling, pricing, and marketing insurance policy contracts is implemented by programming a computer system to automatically charge premiums to an account of the insured at the end of the first period of coverage and during the second period of coverage. A software program running on a computer can be operative to design policy contracts comprising a first period of coverage for a first benefit amount for which a premium is paid to an insurer on behalf of an insured person by a sponsoring organization and a second period of coverage for a second benefit amount for which a premium is paid to the insurer by the insured person, wherein prior to the first period of coverage, the insurer obtains authorization from the insured to have premiums for the second period paid automatically from an account, and automatically charge one or more premium to the account of the insured at the end of the first period and during the second period of coverage.

A more complete understanding of the invention as well as further features and advantages thereof will be apparent from the following drawings, detailed description, and claims.

DETAILED DESCRIPTION OF THE INVENTION

Figure 1:
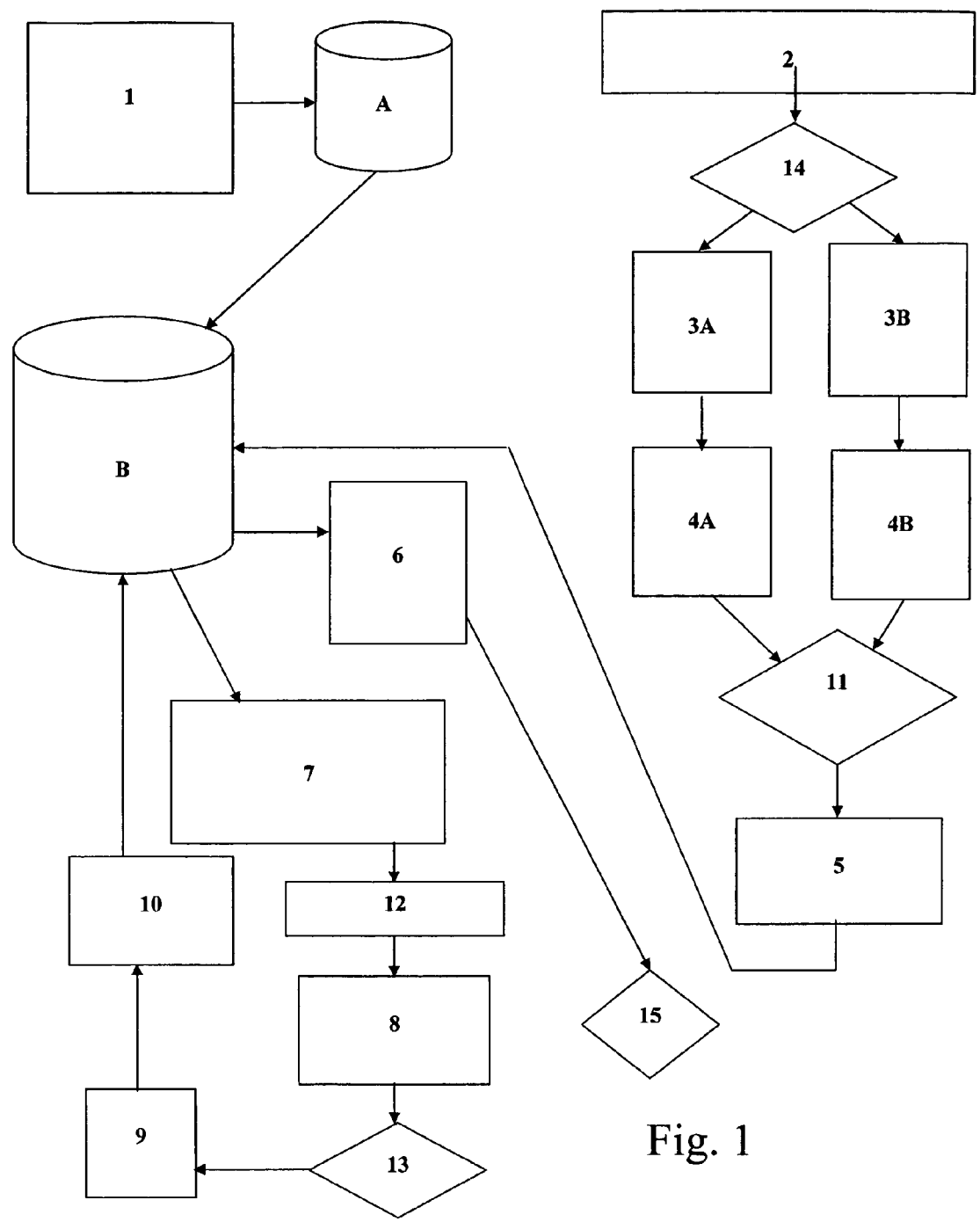
FIG. 1 is a flow chart illustrating one embodiment of the invention.

Referring first to FIG. 1, an embodiment of the invention is illustrated wherein Policy Application Codes 1 are defined prior to the start of a marketing campaign. The Policy Application Codes 1 indicate the Initial Coverage Amount, Initial Coverage Term, Increased Coverage Amount, and Premium for a policy. The Policy Application Codes are programmed into the Application Code Table A.

Qualified individual members of the sponsoring group are solicited 2 for coverage.

Policy applications are either completed and returned via the US mail 3A or completed over the phone or internet 3B, as symbolized by decision block 14.

Mailed applications 4A are scanned and phone and internet applications 4B are input as symbolized by activity block 11 to create an Enrollment Data File 5. The Enrollment Data File 5 includes all personal information and selected coverage.

The Enrollment Data File 5 is input into the Policy Master Database B and a record for each policy is created. The policy record includes effective date, initial coverage amount, initial coverage term, increased coverage amount, billing date and premium amount.

The policy print routine 6 is run on a daily basis and new policies 15 are printed and mailed to insured individuals.

One month prior to the end of the Initial Coverage Period a coverage reminder letter is mailed 7 to insureds to inform them that at the end of the initial coverage period symbolized by block 12, the amount of coverage will increase and premiums billing will commence. In addition, insureds will also be solicited for additional coverage.

At the end of the Initial Coverage Period, a billing file is generated 8 for the premium amounts due for the increased coverage and premium bills 13 are sent to insureds.

Payments are received 9 from customers.

Policy records are updated 10 to advance the policy paid date.

An example of designing and marketing a particular policy according to the preferred formulas of the invention comprises calculating the profit per policy as follows. Assuming L (sponsor leads eligible for marketing)=100,000, R1 (percent of L enrolling for coverage in addition to first period coverage)=0.4%; P1 (annual premium for coverage in addition to first period coverage)=$90.00; PR1 (percent of policies issued for coverage in addition to first period coverage for which the first modal premium is paid)=80%; AF1 (present value of future P1 at a specific discount rate divided by P1)=2.5 years; R2 (percent of L enrolling for first period coverage)=2%; P2 (annual premium for second period coverage)=$84.00; PR2 (Percent of policies issued for first period coverage for which the first modal premium is paid for second period coverage)=35%; AF2 (present value of future P2 at a specific discount rate divided P2)=2 years; R3 (percent of first period policies issued that at the end of the first period coverage enroll in additional coverage)=0.5%; P3 (annual premium for additional coverage offered at the end of the first coverage period)=$150; PR3 (Percent of policies issued for additional coverage at the end of the first period for which the first modal premium is paid)=80%; AF3 (present value of future P3 at a specific discount rate divided P3)=2.5 years; CC1 (the anticipated claims cost percentage for P1)=30%; CC2 (the anticipated claims cost percentage for P2)=30%; CC3 (the anticipated claims cost percentage for additional coverage issued at the end of the first period coverage)=20%; CC4 (the anticipated claims cost percentage for $1^{st}$ period coverage)=90%; P4 (the annual premium for $1^{st}$ period coverage)=$0.36; C (commission percentage of collected premiums paid to sponsor)=30%; CR=claims incidence rate=0.000324; M1 (marketing cost of initial solicitation)= $0.375 per lead; M2 (marketing cost of solicitation at the end of the first coverage period)=$0.375 per lead; A1=administration cost for coverage in addition to first period coverage=$7.20 per policy; A2=administration cost for second period coverage=$8.40 per policy; A3=administration cost for coverage offered at the end of the first coverage period=$30.00 per policy;

Then according to the formula, Profit per policy=(((100,000×0.004×90×2.5)+(100,000×0.02×84×0.35×2.0)+(100,000×0.02×0.005×150×0.8×2.5))−(0.3×100,000×0.004×90× 0.8×2.5)−(0.3×100,000×0.02×84×0.35×2.0)−(0.2×100,000× 0.02×0.005×150×0.8×2.5)−(0.9×100,000×0.02×0.36)− ((0.30×100,000×0.004×90×0.8×2.5)+(100,000×0.02×84× 0.35×2)+(100,000×0.02×0.005×150×0.8×2.5))−(100,000× 0.375)−(100,000×0.004×0.375)−(100,000×0.004×7.2)− (100,000×0.02×8.4)−(100,000×0.02×0.005×30))/(100,000× 0.02)=$9.38.

The First benefit amount=0.36/(0.000324/0.9)=$1,000.

Additional marketable sponsor leads=(100,000×2%×84× (1−0.3)×0.35×2)/0.375=219,520.

Whereas the invention has been described and illustrated in detail, various alternative embodiments, modifications, and improvements should become readily apparent to those skilled in this art without departing from the spirit and scope of the invention as set forth in the following claims.

What is claimed is:

1. A computer-implemented data processing method for pricing and marketing insurance policy contracts, the policy contracts comprising a first period of coverage for a first benefit amount for which a premium is paid to an insurer on behalf of an insured person by a sponsoring organization and a second period of coverage for a second benefit amount for which a premium is paid to the insurer by the insured person, wherein prior to the first period of coverage, the insurer obtains authorization from the insured to have premiums for the second period of coverage paid automatically from an account, comprising the steps of:

(A) charging by a programmed computer an account of the sponsoring organization a premium for the first period of coverage upon entering into a policy contract between the insurer and the insured, and (B) automatically charging by the programmed computer one or more premiums to the account of the insured at the end of the first period and during the second period of coverage.

2. The method of claim 1 wherein the second benefit amount is at least three times greater than the first benefit amount.

3. The method of claim 1 wherein the second benefit amount is at least ten times greater than the first benefit amount.

4. The method of claim 1 wherein the first benefit amount is determined according to the formula: First benefit amount=P4/(CR/CC4), wherein P4=the annual premium for first period coverage; and CC4=the anticipated claims cost percentage for first period coverage.

5. The method of claim 1 comprising inputting into the programmed computer data corresponding to values for L, R2, P2, CC2, PR2, AF2, and M1 wherein one or more additional marketable sponsor leads are calculated by the programmed computer according to a formula: Additional marketable sponsor leads=(L×R2×P2×(1−CC2)×PR2×AF2)/ M1, wherein L=sponsor leads eligible for marketing; R2=percent of L enrolling for first period coverage; P2=annual premium for second period coverage; CC2=the anticipated claims cost percentage for second period coverage (P2); PR2=Percent of policies issued for first period coverage for which the first modal premium is paid for second period coverage; AF2=present value of future P2 at a selected discount rate, D, divided by P2; P2=annual premium for second period coverage; and M1=marketing cost of initial solicitation.

6. The method of claim 1 comprising inputting into the programmed computer data corresponding to values for L, R1, R2, R3, P1, P2, CC1, CC2, CC3, CC4, PR1, PR2, AF1, AF2, AF3, CR, M1, and M2, wherein an expected profit per policy to an insurer value is calculated by the programmed computer according to a formula: profit per policy=(((L×R1× P1×PR1×AF1)+(L×R2×P2×PR2×AF2)+(L×R2×R3×P3× PR3×AF3))−(CC1×(L×R1×P1×PR1×AF1))−(CC2×(L×R2× P2×PR2×AF2))−(CC3×(L×R2×R3×P3×PR3×AF3))− (CC4×(L×R2×P4))−(C×((L×R1×P1×PR1×AF1)+(L×R2× P2×PR2×AF2)+(L×R2×R3×P3×PR3×AF3)))−(L×M1)−(L× R2×M2)−(L×R1×A1)−(L×R2×A2)−(L×R2×R3×A3))/(L× R2), wherein L=sponsor leads eligible for marketing R1=percent of L enrolling for coverage in addition to first period coverage P1=annual premium for coverage in addition to first period coverage PR1=percent of policies issued for coverage in addition to first period coverage for which the first modal premium is paid AF1=present value of future P1 at a specific discount rate divided by P1

R2=percent of L enrolling for first period coverage

P2=annual premium for second period coverage

PR2=Percent of policies issued for first period coverage for which the first modal premium is paid for second period coverage AF2=present value of future P2 at a specific discount rate divided by P2

R3=percent of first period policies issued that at the end of the first period coverage enroll in additional coverage P3=annual premium for additional coverage offered at the end of the first coverage period PR3=Percent of policies issued for additional coverage at the end of the first period for which the first modal premium is paid AF3=present value of future P3 at a specific discount rate divided by P3

CC1=the anticipated claims cost percentage for additional coverage (P1)

CC2=the anticipated claims cost percentage for second period coverage (P2)

CC3=the anticipated claims cost percentage for additional coverage issued at the end of the first period coverage CC4=the anticipated claims cost percentage for first period coverage
P4=the annual premium for first period coverage
C=commission percentage of collected premiums paid to sponsor
CR=claims incidence rate
M1=marketing cost of initial solicitation
M2=marketing cost of solicitation at the end of the first coverage period
A1=administration cost for coverage in addition to first period coverage
A2=administration cost for second period coverage
A3=administration cost for coverage offered at the end of the first coverage period.

7. The method of claim 1 wherein benefit amounts are payable upon accidental death, accidental disability, disability, dismemberment, paralysis, hospitalization, diagnosis of a critical illness, unemployment, a family leave event, or loss of life.

8. The method of claim 1, wherein the account is a checking account, credit card account, or mortgage account between the insured and the sponsoring organization.

9. The method of claim 1, wherein the account is a checking account, credit card account, or mortgage account between the insured and an organization other than the sponsoring organization.

10. The method of claim 1, wherein the insured receives one or more premium invoices from the insurer for premiums due after the first period of coverage and during the second period of coverage.

11. The method of claim 1 wherein the insured is given an option prior to or during the first period of coverage to increase the second benefit amount.

12. The method of claim 1 wherein the insured is given an option prior to or during the first period of coverage to enroll in another insurance coverage.

13. The method of claim 1 wherein the insurance policy contract pays a benefit amount to a beneficiary upon the filing of a valid claim by the insured or on behalf of the insured as a result of a covered event.

14. The method of claim 1 wherein the insurer pays a commission to the sponsoring organization during the second period of coverage upon collecting a premium from the insured, comprising charging the sponsoring organization a premium for the first period of coverage upon entering into a policy contract between the insurer and the insured.

15. The method of claim 1 wherein the insurer pays a list marketing fee to the sponsoring organization comprising charging the sponsoring organization a premium for the first period of coverage upon entering into a policy contract between the insurer and the insured.

16. A computer system comprising a processor and a memory having a program stored to generate an insurance policy having terms which provide for a first period of coverage for a first benefit amount for which a premium is paid to an insurer on behalf of an insured person by a sponsoring organization and a second period of coverage for a second benefit amount for which a premium is paid to the insurer by the insured person, and to enable a process wherein if, prior to the first period of coverage, the insurer obtains authorization from the insured to have premiums for the second period paid automatically from an account, the computer system automatically charges one or more premium to the account of the insured at the end of the first period and during the second period of coverage.

17. A non-transitory computer-readable storage medium comprising computer code comprising instructions for designing insurance policy contracts comprising a first period of coverage for a first benefit amount for which a premium is paid to an insurer on behalf of an insured person by a sponsoring organization and a second period of coverage for a second benefit amount for which a premium is paid to the insurer by the insured person, wherein prior to the first period of coverage, the insurer obtains authorization from the insured to have premiums for the second period paid automatically from an account, and automatically charge one or more premium to the account of the insured at the end of the first period and during the second period of coverage.

\* \* \* \* \*